US009179026B2

(12) United States Patent
Petermann et al.

(10) Patent No.: US 9,179,026 B2
(45) Date of Patent: Nov. 3, 2015

(54) DEVICE FOR CANCELLING CHECKS (75) Inventors: Udo Petermann, Altenbeken (DE); Paul Freitag, Steinheim (DE); Richard Duesterhus, Paderborn (DE); Hendrik Hoeschen, Paderborn (DE)

(73) Assignee: Wincor Nixdorf International GmbH (DE)

( * ) Notice: Subject to any disclaimer, the term of this patent is extended or adjusted under 35 U.S.C. 154(b) by 75 days.

(21) Appl. No.: 13/985,838

(22) PCT Filed: Feb. 16, 2012

(86) PCT No.: PCT/EP2012/052659
§ 371 (c)(1),
(2), (4) Date: Sep. 9, 2013

(87) PCT Pub. No.: WO2012/110586
PCT Pub. Date: Aug. 23, 2012

(65) Prior Publication Data
US 2013/0342855 A1    Dec. 26, 2013

(30) Foreign Application Priority Data
Feb. 17, 2011    (DE) .......................... 10 2011 000 785

(51) Int. Cl.
| | |
|---|---|
| *G06K 15/16* | (2006.01) |
| *H04N 1/193* | (2006.01) |
| *H04N 1/00* | (2006.01) |
| *B41J 13/00* | (2006.01) |
| *B65H 5/02* | (2006.01) |

(Continued)

(52) U.S. Cl.
CPC ......... *H04N 1/00641* (2013.01); *B41J 13/0009* (2013.01); *B41J 13/009* (2013.01); *B65H 5/026* (2013.01); *B65H 15/00* (2013.01); *B65H 29/006* (2013.01); *B65H 29/58* (2013.01); *G07D 7/168* (2013.01); *G07D 11/0018* (2013.01);

(Continued)

(58) Field of Classification Search
None
See application file for complete search history.

(56) References Cited

U.S. PATENT DOCUMENTS

| | | |
|---|---|---|
| 6,257,783 B1 | 7/2001 | Hanaoka et al. |
| 7,954,816 B2 | 6/2011 | Freitag et al. |

(Continued)

FOREIGN PATENT DOCUMENTS

| | | |
|---|---|---|
| DE | 19904536 A1 | 8/2000 |
| DE | 10203176 A1 | 8/2003 |

(Continued)

OTHER PUBLICATIONS

International Preliminary Report on Patentability for PCT/EP2012/052659 mailed Aug. 29, 2013 with English translation (20 pages).

(Continued)

*Primary Examiner* — Benny Q Tieu
*Assistant Examiner* — Haris Sabah
(74) *Attorney, Agent, or Firm* — Harness, Dickey & Pierce, P.L.C.

(57) ABSTRACT

The invention relates to a device for cancelling notes of value, comprising a transport unit for transport of the notes of value, and a printing unit having a print head for imprinting a printing area of a note of value located on a print side. Further, the device comprises a sorting gate for diverting notes of value between three transport paths, and a control unit for controlling the sorting gate. The device further comprises a sensor unit for determination of the orientation of a note of value, and an intermediate storage for intermediate storage of notes of value, wherein a second transport path connects the sorting gate with the intermediate storage, and a third transport path connects the sorting gate with the printing unit.

10 Claims, 5 Drawing Sheets (51) Int. Cl.
  *B65H 15/00* (2006.01)
  *B65H 29/58* (2006.01)
  *G07D 7/16* (2006.01)
  *G07D 11/00* (2006.01)
  *B65H 29/00* (2006.01)

(52) U.S. Cl.
  CPC .... *G07D11/0033* (2013.01); *B65H 2301/3331* (2013.01); *B65H 2404/632* (2013.01)

(56) References Cited

U.S. PATENT DOCUMENTS

| 8,340,391 | B2 | 12/2012 | Petermann |
| 2006/0163027 | A1 | 7/2006 | Hobmeier et al. |
| 2010/0213023 | A1 | 8/2010 | Freitag et al. |
| 2012/0211935 | A1 | 8/2012 | Petermann et al. |
| 2013/0099439 | A1 | 4/2013 | Duesterhus |

FOREIGN PATENT DOCUMENTS

| DE | 10-2005-003198 A1 | 8/2006 |
| DE | 10-2007-059410 A1 | 6/2009 |
| EP | 0690791 B1 | 6/1997 |
| EP | 0934224 B1 | 6/2001 |
| WO | WO-99-46738 A1 | 9/1999 |
| WO | WO-03-077209 A2 | 9/2003 |
| WO | WO-2009-018879 A1 | 2/2009 |

OTHER PUBLICATIONS

English Translation of the Written Opinion of the ISA for PCT/EP2012/052659, mailed May 15, 2012; ISA/EP.

DEVICE FOR CANCELLING CHECKS

CROSS-REFERENCE TO RELATED APPLICATIONS

This application is a National Stage of International Application No. PCT/EP2012/052659, filed Feb. 16, 2012, and published in German as WO 2012/110586 A1 on Aug. 23, 2012. This application claims the benefit and priority of German Application No. 10 2011 000 785.7, filed Feb. 17, 2011. The entire disclosures of the above applications are incorporated herein by reference.

BACKGROUND

This section provides background information related to the present disclosure which is not necessarily prior art.

1. Technical Field

The invention relates to a device for cancelling notes of value, comprising a transport unit for transport of the notes of value and a print unit having a print head for imprinting a note of value with a cancellation print image. Further, the device comprises an intermediate storage for intermediately storing notes of value.

2. Discussion

In devices for handling notes of value to which also checks may be input, checks are stored in an intermediate storage after their authenticity has been verified and information imprinted thereon has been read out. After all notes of value which were input together have been received in the intermediate storage, a user is asked to confirm a displayed information containing information on the notes of value intermediately stored. If such a confirmation is made by the user the checks received in the intermediate storage are transported to a value note cassette and are stored therein. Prior to this, the checks removed from the intermediate storage are imprinted by printing a cancellation print image on a predetermined printing area on a print side of the checks, in order to thus make sure that the checks are not processed a further time.

A printing device for imprinting the checks with a cancellation print image is, for example known from document DE 10 2005 003 198 A1. From document EP 0 690 791 B1 a document printing device is known comprising an assessment unit which, on the one hand side, scans the presence of a print monitor symbol via a monitoring mark scanning means, and on the other hand assesses the result of the scan.

As mentioned above, the printing area on which a cancellation print image is to be printed is fixed. In particular, such a printing area is provided on one side of the check only, such that the orientation, i.e. the side of the check which faces a print head of the printing unit defines the side of the check that is actually imprintable. One possibility to make sure that each of the checks supplied is imprintable, regardless of its orientation, is providing at least two print heads, wherein the latter are arranged on opposite sides of the transport path along which the checks are transported so that the checks are imprintable regardless of their orientation. What is problematic in this case is that two print heads must be provided, which is, one the one hand, cost-intensive, and which, on the other hand, requires much space.

An alternative conceivable possibility is providing a print head which is movably supported such that it is movable between the two sides of the transport path and the printing area of a check is imprintable, regardless of the orientation of said check. What is problematic also in this case is that a complex elaborated support is necessary which, one the one hand, requires much space, and on the other hand causes high costs.

A further conceivable possibility is that only checks which are input to the device with correct orientation are processed and imprinted by means of the printing unit. Checks which are input in a misoriented manner are returned to the user. What is problematic herein is that this results in less ease of use for the user since he/she must pay attention to the orientation in which the checks are input and must input possibly returned checks one more time.

SUMMARY OF THE INVENTION

It is an object of the invention to specify a device for cancelling notes of value which is constructed in an easy and space-saving manner and which offers a user high ease of use.

According to the invention a sorting gate for directing notes of values between a first transport path, a second transport path and a third transport path as well as a control unit for control of the sorting gate are provided. Further provided is a sensor for determining the orientation of a note of value, wherein the second transport path connects the sorting gate with the intermediate storage and the third transport path connects the sorting gate with the print unit. Via controlling the sorting gate by means of the control unit dependent on the determined orientation in such a manner that the sorting gate directs notes of value removed from the intermediate storage to be cancelled either directly from the second transport path into the third transport path, or first from the second transport path into the first, and then from the first into the third transport path, it is achieved that the note of value can be imprinted on its print side, regardless of the orientation in which it is supplied to the device, since the print side, due to corresponding supply of the note of value to the print unit, always faces the print head. Therefore, only one print head is required, thereby achieving a space-saving, cost-efficient structure. Further, a user of the device for handling notes of value in which the device for cancelling notes of value is provided may input said notes of value in any orientation, so that high ease of use is guaranteed.

The notes of value are in particular checks which must be imprinted with the cancellation print image in a predetermined area on a print side of the check, in order to thereby avoid multiple processing of the checks. The print area may be defined on the face or on the back of the check. The device for cancelling checks according to the invention is in particular employed in devices for handling notes of value to which checks and banknotes may be input in a mixed manner in a value note stack. Subsequently the notes of value are separated and the authenticity of the notes of value is verified. Further, imprinted information on the notes of value are read and assessed. During assessment a character recognition for extracting imprinted information may be carried out.

What is to be understood by directing a note of value from one transport path to another transport path by means of the sorting gate is in particular that the sorting gate guides the note of value which is transported by means of transporting elements from the one transport path into the other. Here, the sorting gate may change or not change the direction in which the note of value is transported.

For determination of the orientation of the notes of value in particular the sensor of the sensor unit is used by means of which also the authenticity of the notes of value is verified, so that no separate sensor is required for this purpose, and thus a simple, cost-efficient structure is achieved.

What is meant by orientation of the note of value in particular is the way the note of value is input into the device. In particular this means whether the face or the back is directed upward when the note of value is input.

Dependent on the determined orientation, the control unit in particular determines which side of the note of value would face the print head if the notes of value were transported directly from the second transport path to the third transport path and further to the print unit. If the determination results in that the defined print side would face the print head, the control unit controls the sorting gate to directly transport the note of value from the second transport path to the third transport path, and thus supply it to the print unit in a way that the defined target print side faces the print head. Thus, the print area of the note of value is imprintable with the cancellation print image by means of the print head.

If the determination, however, results in that the note of value would be supplied to the print unit such that the defined target print side would be turned away from the print head, the control unit controls the sorting gate to first direct the note value from the second transport path to the first transport path, and subsequently from the first transport path to the third transport path. Thereby the note of value is turned over so that afterwards the defined target print side is facing the print head when the note of value is supplied to the print unit.

It is thus achieved that the defined target print side of the note of value is imprintable by means of only one print head without providing further components, regardless of which way the note of value is input into the device. In particular, it is not necessary to provide a separate turning unit for turning over the notes of value.

The sensor unit is in particular arranged in the first transport path so that the orientation of the notes of value is determined first, before they are guided from the first transport path to the second transport path and further to the intermediate storage by means of the sorting gate. In an alternative embodiment of the invention, the sensor unit may also be arranged in the second transport path between the sorting gate and the intermediate storage. In this case, the sensor unit may determine the orientation of the notes of value either during transport from the sorting gate to the intermediate storage, or after removal of a note of value intermediately stored in the intermediate storage during transport from the intermediate storage to the sorting gate.

In particular, all notes of value input are supplied from the first transport path via the sorting gate to the second transport path, and thus to the intermediate storage, after their authenticity has been verified and their orientation has been determined. After all notes of value of an input value note stack have been stored in the intermediate storage, and after a user has input a confirmation information the notes of value intermediately stored in the intermediate storage are, dependent on their respective orientation, transported either directly from the second transport path to the third transport path and further to the print unit, or via the detour from the second transport path to the first and then to the third transport path, so that all notes of value are imprintable, regardless of their orientation during input.

The sorting gate is in particular formed such that it is adjustable between three sorting gate positions, wherein in a first sorting gate position, a note of value is directed by the sorting gate between the first and the second transport path, in a second sorting gate position between the second and the third transport path, and in a third sorting gate position between the first and the third transport path. Accordingly, the control unit sets the first sorting gate position for transport of a note of value from the first to the second transport path, the first sorting gate position for transport from the second to the first transport path, the second sorting gate position for transport from the second to the third transport path, and the third sorting gate position for transport from the first to the third transport path.

The sensor unit preferably comprises a magnetic sensor, in particular a magnetic-ink-character-recognition-sensor (MICR sensor). By means of this sensor, it is possible to read out a magnetic information provided in a MICR area of checks that is in particular provided as magnetic ink or magnetic toner. Via reading this magnetic information, it is possible to determine on which side of the note of value the MICR area is provided. It is preset in the control unit whether the MICR area and the print area are located on the same side or on different sides of the note of value, so that via determination of the side on which the MICR area is located, it is also possible to determine which side is the print side.

In particular, a so-called quad-magnetic-character-recognition-sensor is employed by means of which the MIRC area can be read regardless of the orientation of the note of value since a sensor of this type comprise a four sensors, wherein two sensors are arranged on the first side of the transport path along which the notes of values are transported, and the other two sensors are arranged on the opposite second side of the transport path.

In an alternative embodiment of the invention, the sensor unit may additionally or alternatively comprise also a camera by means of which at least one image comprising a representation of the note of value is captured. Through the comparison of this representation with the preset characteristic features of notes of value the orientation of the note of value can be determined in an easy manner. For this purpose, in particular image processing algorithms are stored in the control unit that are executed by the control unit for determining the defined print side.

The print unit is in particular formed such that only single-sided print is imprintable on the note of value, so that a particularly simple, cost-efficient structure is achieved. Thanks to the relatively simple turning over of notes of value with incorrect orientation via a sorting gate, it is not necessary to employ a complex-structure print unit by means of which the notes of value are imprintable on both sides. Incorrect orientation of notes of value means that these notes of value are not facing the print head with their defined target print side.

BRIEF DESCRIPTION OF THE DRAWINGS

The drawings described herein are for illustrative purposes only of selected embodiments and not all possible implementations, and are not intended to limit the scope of the present disclosure.

Further features and advantages of the invention result from the following description which in connection with the enclosed FIGS. explains the invention in more detail with reference to embodiments.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
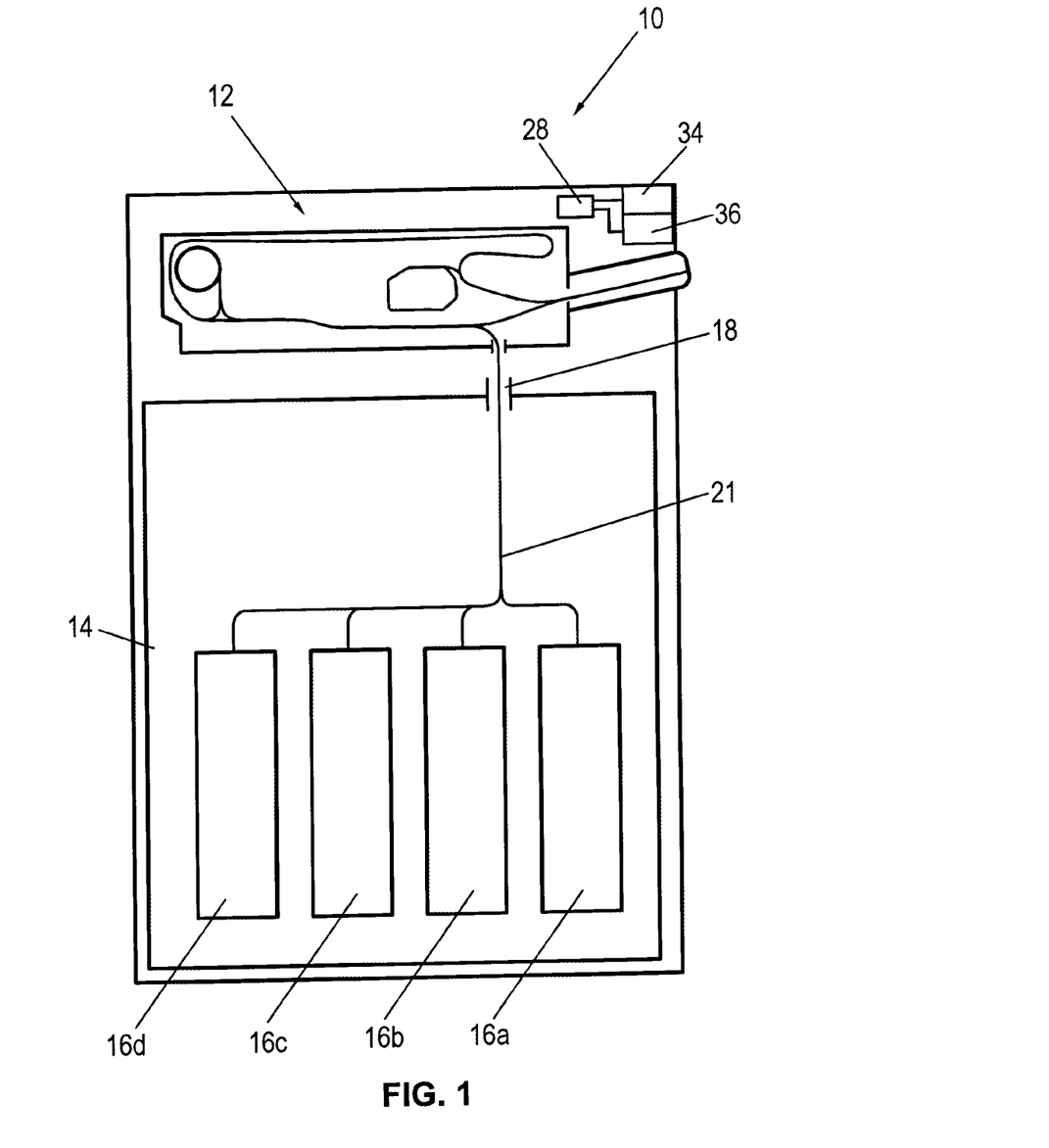
FIG. 1 shows a schematic illustration of a device for handling notes of value.

In FIG. 1, a schematic illustration of a device 10 for handling notes of value is illustrated. The device 10 is in particular an automatic cash safe, an automatic cash system and/or an automated teller machine, such as a deposit machine for depositing banknotes and checks.

The device 10 comprises a head module 12 and a safe 14. The structure of the head module 12 is described in more detail in connection with FIG. 2. In the safe 14, four value note cassettes 16*a* to 16*d* are arranged in which the notes of value can be held. Here, in particular one of the value note cassettes 16*a* to 16*d* is provided for holding checks and the other three value note cassettes 16*a* to 16*d* are provided for holding banknotes. The banknotes are in particular held in a type-specific manner, i.e. in one value note cassette 16*a* to 16*d* always only banknotes of one specific denomination are contained. Alternatively, also a mixed storage may be realized, i.e. that in one value note cassette 16*a* to 16*d* notes of value of different denominations are held in a mixed manner. In an alternative embodiment, also more than four or less than four, in particular two value note cassettes 16*a* to 16*d* can be provided in the safe 14. In particular, a so-called reject cassette can be provided in which notes of value are held that are suspected of being counterfeit and/or are damaged. In a preferred embodiment, two value note cassettes 16*a* to 16*d*, namely one for holding checks and one for holding banknotes are provided.

Here, the notes of value can be held in the value note cassettes 16*a* to 16*d* in stacked form in a receiving area as well as wound up between two film tapes onto a roller store. Different types of value note cassettes can also be used within the safe 14.

In the present embodiment, the device 10 can be designed as a mere depositing device into which notes of value can only be deposited. Alternatively, it can also be designed as a recycling device into which notes of value can be deposited and can again be withdrawn therefrom.

The safe 14 has a transfer slot 18 through which the notes of value are supplied from the head module 12 to the safe 14. From the transfer slot 18, the notes of value are transported via a transport unit identified with the reference sign 21 to the value note cassettes 16*a* to 16*d*.

Figure 2:
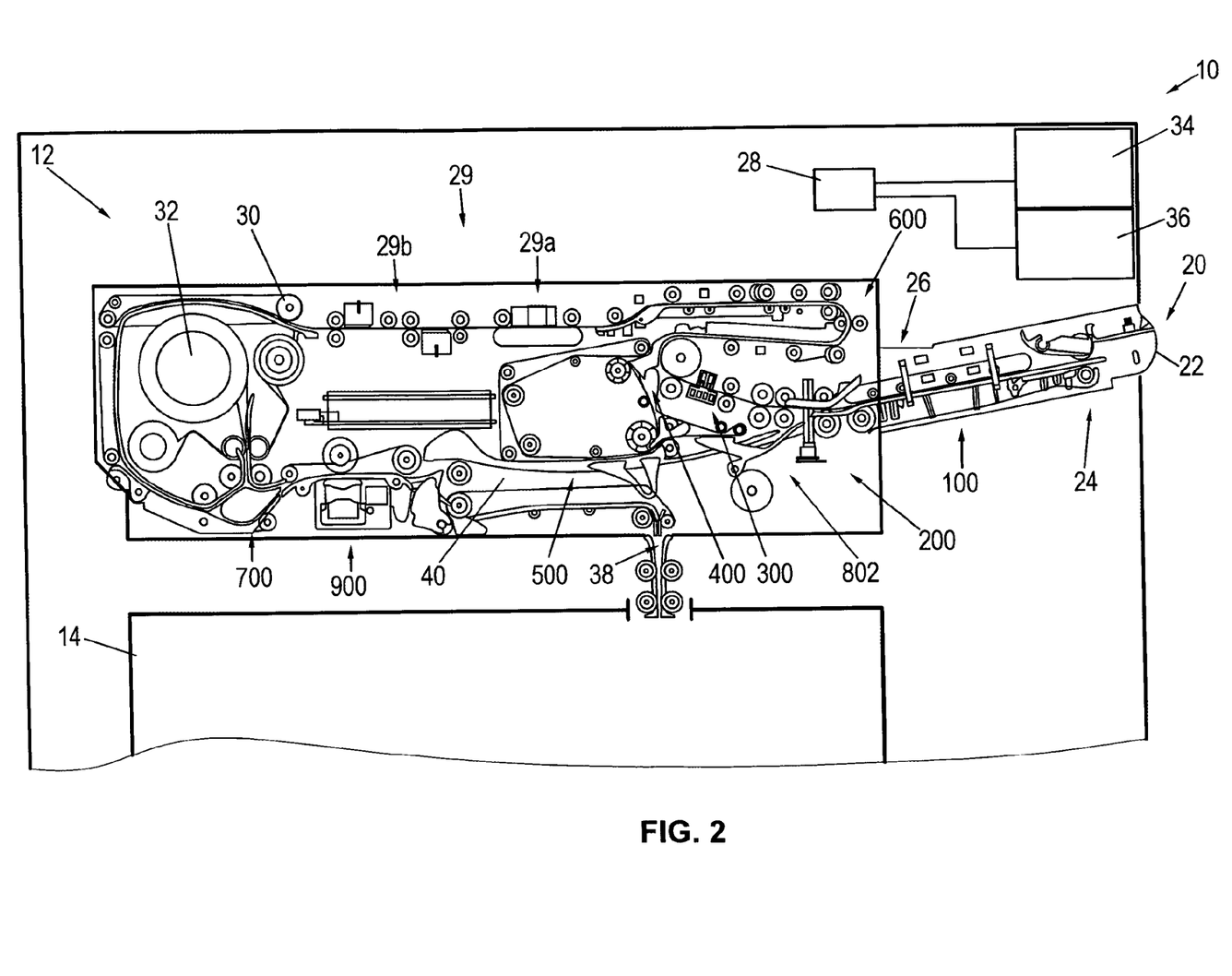
FIG. 2 shows a schematic illustration of a head module of the device according to FIG. 1.

In FIG. 2, a schematic illustration of the head module 12 according to FIG. 1 is shown. The head module 12 has an input and output unit 20 via which the notes of value can be input in the form of a value note stack. Further, via this input and output unit 20 individual notes of value and/or value note stacks can be returned to the user of the device 10. The input and output unit 20 in particular has a so-called shutter 22 by means of which an opening for feeding and outputting the notes of value can be opened and closed.

A value note stack input via the input and output unit 20 is transported to a first aligning unit 100 by means of a transport unit 24. By means of the first aligning unit 100, the notes of value of the value note stack are placed into a preset orientation or at least the orientation of a part of the notes of value of the value note stack is changed such that it is approximated to the preset orientation. By means of a transport unit 26, the aligned value note stack is supplied to a separating unit 200 which separates the notes of value of the value note stack and supplies the separated notes of value to a first sensor unit 300.

The first sensor unit 300 comprises an image detection unit by means of which at least one image with a representation of this note of value is taken of each supplied note of value. Dependent on the representation of the note of value in the image, a control unit 28 of the device 10 determines at least one feature of the note of value and, dependent on this feature, classifies the note of value into checks, banknotes of a preset currency and other sheet-shaped media. The other sheet-shaped media can, for example, be notes of value of a currency different from the preset one and/or other sheet-shaped media which were erroneously input by the user of the device. For example, these can be business cards or account statements. The preset currency is in particular the currency that is to be handled by means of the device 10, in particular that is to be held in the value note cassettes 16*a* to 16*d*.

Those notes of value that were neither classified as checks nor as banknotes of the preset currency will be transported via a sorting gate 400 into a second intermediate storage 500 for intermediate storage of sheet-shaped media and will be intermediately stored therein preferably as a second value note stack. The checks and the banknotes of the preset currency, on the other hand, are supplied via the sorting gate 400 to a second aligning unit 600. By means of this second aligning unit 600 the checks are aligned in a first preset target orientation and the banknotes are aligned in a second target orientation differing from the first target orientation. In particular, several different target orientations for banknotes of different denominations are preset and the second aligning unit 600 aligns the notes of value in different preset target orientations not only dependent on whether checks or banknotes are concerned but additionally also dependent on the denomination of the banknotes.

The aligned notes of value are then supplied to a second sensor unit 29 by means of which the authenticity of the banknotes is determined and by means of which magnetic information on the checks is read out. The sensor unit 29 comprises a banknote sensor unit 29*a* by means of which the authenticity of the banknotes is verified and a check sensor unit 29*b* by means of which the authenticity of the checks is verified and information printed on the checks is read out. The first sensor unit 300 and the second sensor unit 29 form together with the control unit 28 in particular a non-counterfeit money and check detection module. In the determination of the authenticity of the banknotes and/or checks preferably also information determined by means of the sensor unit 300 is taken into account.

Subsequently, the notes of value are transported toward a second sorting gate 700 by means of further transport elements, one of which is exemplarily identified with the reference sign 30. Via the second sorting gate 700, all notes of value of the previously input value note stack which were classified as checks or banknotes of the preset currency, are at first supplied to a first intermediate storage 32 and intermediately stored therein. The intermediate storage 32 is in particular designed in the form of a roller store in which the notes of value to be held are held in a wound up manner between two film tapes. After all notes of value of the input value note stack have been accommodated in the first intermediate storage 32 or the second intermediate storage 500, at least one information about the notes of value held in the first intermediate storage 32 and/or in the second intermediate storage 500 is output to the user via a display unit 34. This information in particular comprises information about the number of input notes of value and/or the value of the sum of the denominations of the input notes of value that are held in the first intermediate storage 32. Further, the user is in particular asked to input a confirmation information via an input unit 36.

When no confirmation information is input via the input unit 36 by the user within a preset time interval after request and/or when the user makes a negative input then the notes of value contained in the first intermediate storage 32 are transported away from this store and are supplied to a stacking unit 40, by means of which a first value note stack is formed from all notes of value contained in the first intermediate storage 32. Further, the second value note stack contained in the second intermediate storage 500 is removed from the second intermediate storage 500. Both the first value note stack and the second value note stack are supplied to a stack combining unit 802 by means of which a single combined value note stack is formed from the first and the second value note stacks. This combined value note stack is then returned to the user via the input and output unit 20.

When, on the other hand, the user inputs the confirmation information within the preset time interval after the respective request, then the second value note stack is removed from the second intermediate storage 500 and is returned to a user via the input and output unit 20.

The notes of value intermediately stored in the first intermediate storage 32, on the other hand, are supplied along a transport path 38 to the safe 14 and are received in the value note cassettes 16a to 16d. Before they are transported into the safe 14, the checks intermediately stored in the first intermediate storage 32 are cancelled in that a cancellation print image is printed onto a preset print area of the check. For this purpose, a printing unit 900 for imprinting the checks is provided between the second sorting gate 700 and the transport path 38. Via the sorting gate 700, the checks are supplied to the printing unit 900 such that the printing area on which the cancellation information is to be printed faces the print head of the printing unit 900 so that the print head can print the cancellation print image onto this printing area.

By means of the afore-described head module 12, it is achieved that in one device 10 checks and banknotes can be handled together and these can be supplied to the device in an arbitrarily mixed manner in one stack. In this way, a particularly high operating comfort is achieved for a user of the device 10 as the user does not have to manually presort the notes of value into checks and banknotes nor does he have to preset which type of notes of value is supplied, as is the case in known devices.

After the checks have been aligned in the preset first target orientation by the alignment unit 600, and the banknotes have been aligned in the preset second target orientation by the alignment unit 600, both, the banknotes and the checks are supplied to the sensor unit 29.

The sensor unit 29b comprises an MICR reading unit by means of which magnet information provided on an MICR area of a check are readable. An MICR reading unit of this type is known from document DE 10 2007 059 410 A1. Structure and function of an MICR reading unit of this type are included by way of reference into the present description. In particular, the MICR reading unit comprises four MICR sensors for detecting the magnetic information provided in the MICR area so that the information contained in the check's MICR area can be read out by the MICR reading unit, regardless of how the checks were input into the input and output unit 20.

In addition to the MICR area, a target printing area is defined on each check where a cancellation print image is to be imprinted by the print unit 900 for cancelling the check in order to avoid multiple processing of the check. In the following, that side (face or back) of the check where this printing area is located is referred to as the check's print side. The MICR range and the printing range can be located on the same side of the check, or, alternatively on the two different sides of the check.

The printing unit 900 has a print head 902 by means of which the cancellation print image is imprinted on the printing area of the check to be cancelled. The print head 902 is designed such that only checks whose print side faces the print head can be imprinted by it. In particular, the print head is arranged in a stationary manner, so that it is not pivotable from the one side of the transport path along which the checks are transported to the other side of the transport path. In particular, a printing unit 900 is employed having only exactly one print head 902 or two print heads 902, with these two print heads 902 being arranged on the same side of the transport path.

In order to allow for imprinting a check supplied to the printing unit 900 with the cancellation print image in the printing area in the required manner, this check must therefore be supplied to the printing unit 900 in such manner that its print side faces the print head 902. This is achieved by correspondingly controlling the sorting gate 700 via the control unit 28, as described in the following in connection with FIGS. 3 to 5. For this purpose, the control unit 28 first determines the orientation of the check, i.e. the control unit 28 determines whether the upper side or the lower side detected by the sensor unit 300 is the print side to be imprinted.

Detection is made alternatively or additionally by means of the MICR reading unit. The control unit 28 is capable of determining via the MICR reading unit on which side the check's MICR area is provided. It is stored in the control unit 28 whether the MICR area and the printing area are provided on the same side or on opposite sides of the check. Thus, when the control unit 28 knows on which side the MICR area is provided, the control unit can determine which side of the check is the print side.

In an alternative embodiment of the invention determination of the check's print side can be made in accordance with the image comprising the representation of the check that was generated by means of the sensor unit 300 for classifying the sheet-shaped media input. For this purpose, the control unit 28 in particular compares whether characteristic preset features of checks which are provided only on one side of checks are present in the representation, and determines via this comparison which side of the input check is the print side.

Like the banknotes, the input checks are transported via a first transport path 702 from the sensor unit 29 to the sorting gate 700 which in a first sorting gate position diverts the checks and banknotes in a second transport path 704, wherein said second transport path 704 connects the sorting gate 700 with the first intermediate storage 32. This way, all the banknotes and checks of the input stack that were not received in to second intermediate storage 500 are first received in the first intermediate storage 32 and intermediately stored therein. Subsequently, the information on the notes of value received is displayed to the user via the display unit 34. The first intermediate storage 32 is in particular designed as a roller store, wherein the notes of value are wound up between two film tapes.

After the user has input a confirmation information via the input unit 36, the banknotes and checks received in the first intermediate storage 32 are again removed therefrom and transported to the safe 14 via the transfer slot 18. There, the banknotes and/or checks are received in the value note cassettes 16a to 16d, wherein the checks are cancelled prior to this by means of the printing unit 900 via imprinting the cancellation print image.

Figure 3:
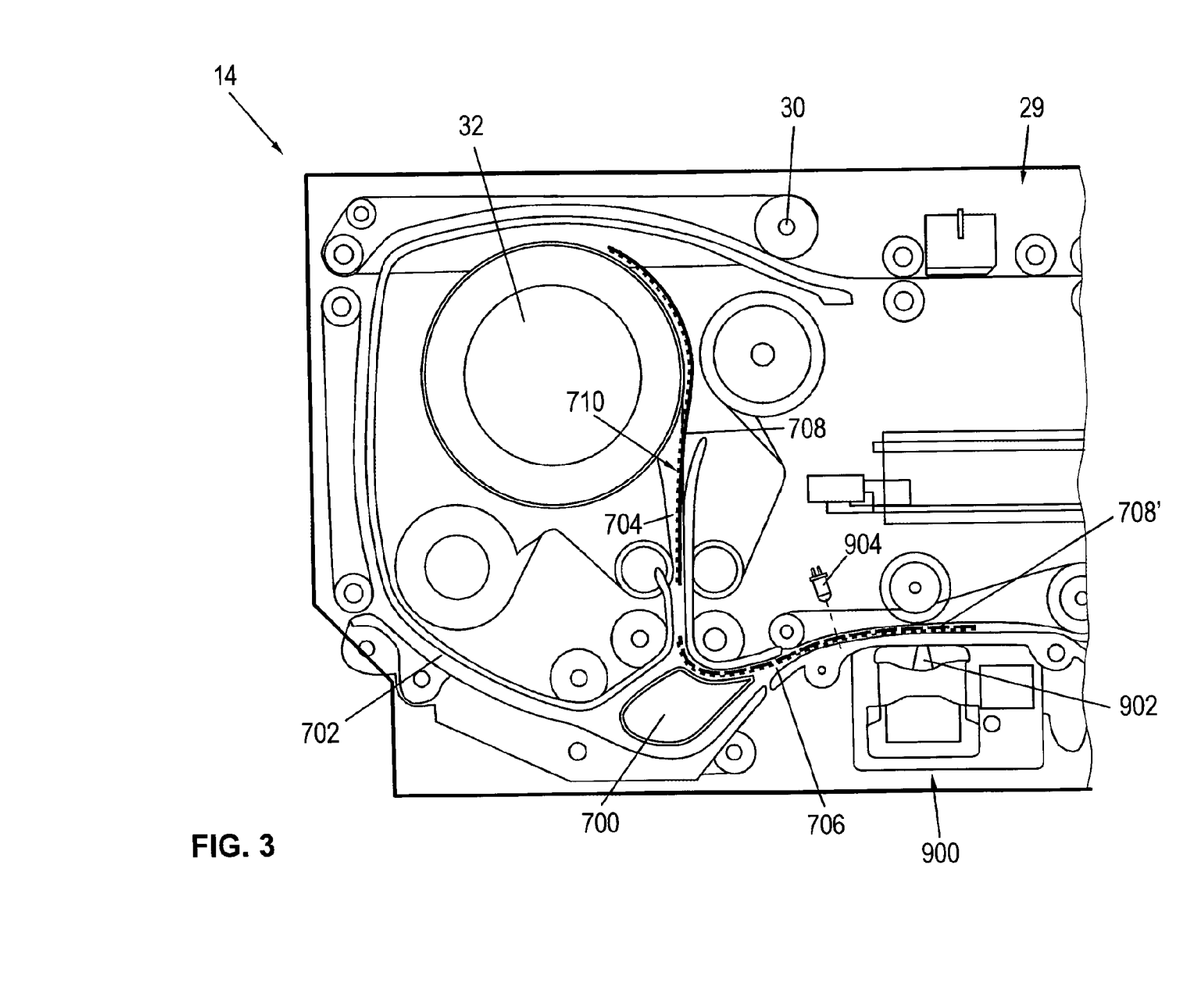
FIG. 3 shows a schematic illustration of a detail of the head module according to FIG. 2 in a first operational state.

In FIG. 3, a schematic view of a detail of the head module 12 according to FIG. 2 is illustrated, wherein in the first operational state shown in FIG. 3 a check 708 has already partly been withdrawn from the intermediate storage 32 and is partly placed in the second transport path 704. The print side of the check 708 is indicated by the dotted line 710. With the orientation shown in FIG. 3, the control 28 controls the sorting gate 700 such that it is set in a second sorting gate position in which it directs the check 708 away from the second transport path into a third transport path 706, said third transport path connecting the sorting gate 700 with the printing unit 900. As illustrated by the dotted check 708', the check 708, 708' is in this case supplied to the printing unit 900 such that the print side 710 faces the print head 902, thus allowing the print head 902 to imprint the cancellation print image on the printing area on the print side 710.

Figure 4:
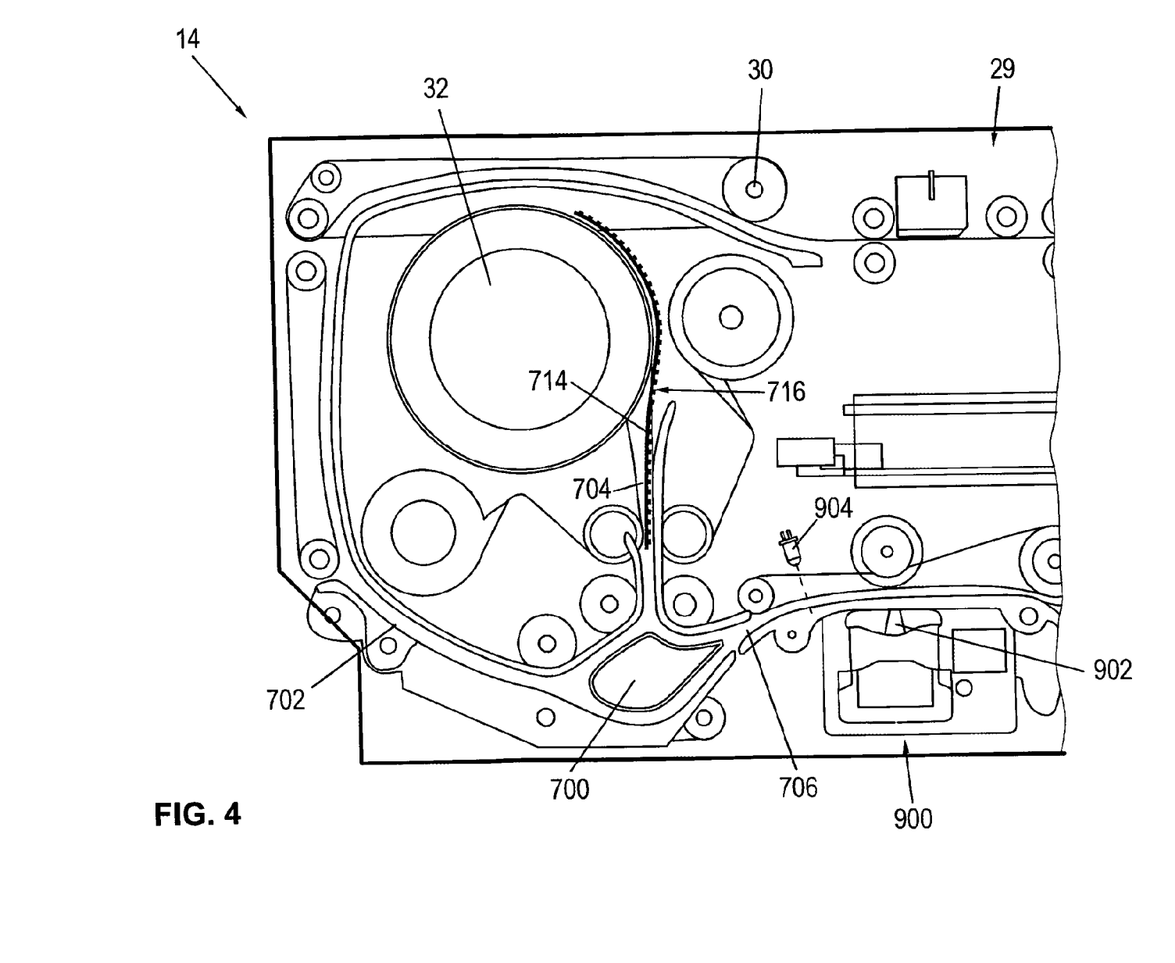
FIG. 4 shows a schematic illustration of the detail of the head module according to FIG. 3 in a second operational state.

In FIG. 4, a detail of the head module 12 is shown in a second operational state wherein a check 714 is located in the second transport path 704 with its print side 716 lying on the opposite side of check 714, as compared with check 708 in FIG. 3. In this case, if the check 714 would be transported directly from the second transport path 704 into the third transport path 706, it would be supplied to the printing unit 900 such that its print side 716 would not face the print head 902, so that imprinting the cancellation print image on the printing area would not be possible, and the check 714 could therefore not be cancelled as desired. For this reason, the control unit 28 in this case controls the sorting gate 700 such that it is first set in the first sorting gate position and redirects the check 714 back into the first transport path 702. Herein, the check 714 is transported back into the first transport path so far that it is fully arranged in the first transport path 702.

Figure 5:
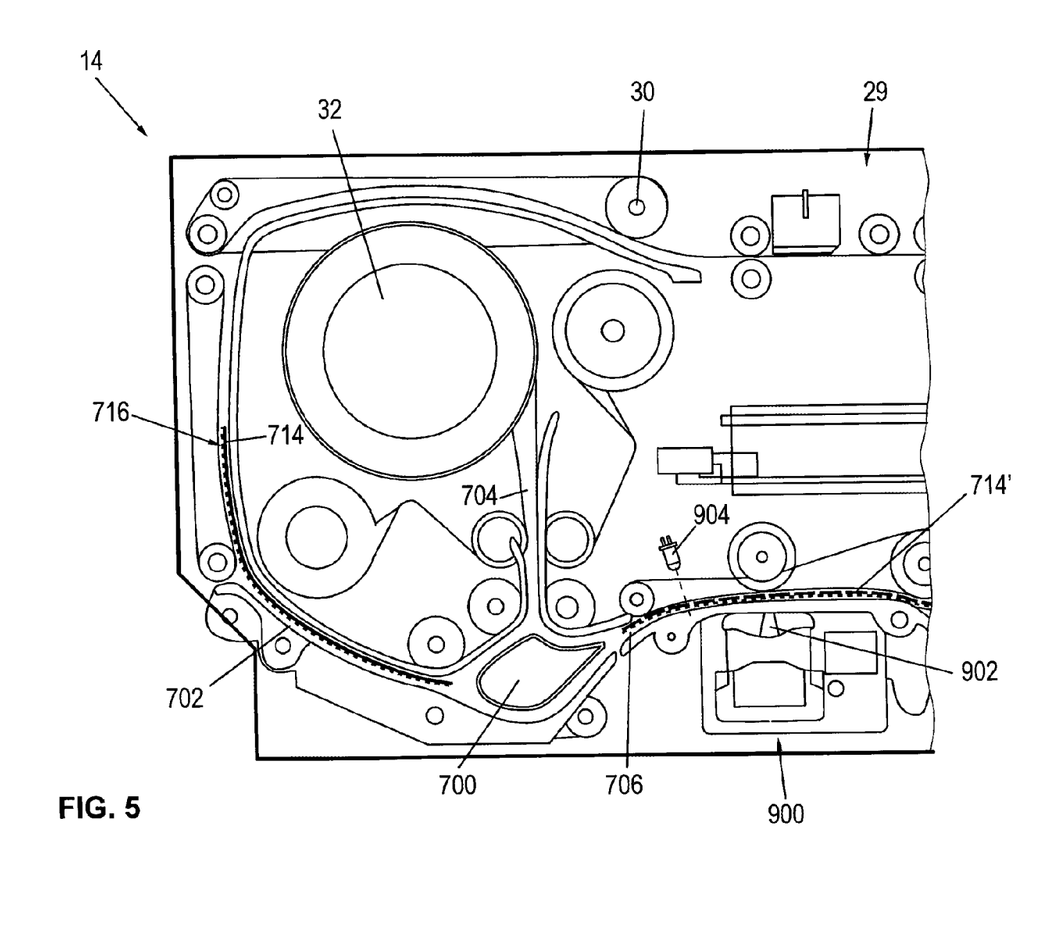
FIG. 5 shows a schematic illustration of the detail of the head module according to FIGS. 3 and 4 in a third operational state.

In FIG. 5, the head module 14 is shown in a third operational state wherein the check 714 has been transported back into the first transport path 704. Subsequently, the control unit 28 controls the sorting gate 700 such that the sorting gate is arranged in the third sorting gate position where it directs the check 714 from the first transport path 702 into the third transport path 706, thus supplying it to the printing unit 900. As indicated by the dotted check indicated by reference number 714', the check 714 is thereby supplied to the printing unit 900 in such a way that its print side 716 is facing the print hat 902, thus allowing the printing area to be imprinted with the cancellation print image by be print head 902.

Thus, checks 714, 714' which are held in the intermediate storage 32 "the wrong way round", i.e. which are held in such a way that it would not be possible to imprint them with the cancellation print image in their printing area when directly supplied from the intermediate storage 32 to the printing unit 900 via the second sorting gate position, can be turned over in an easy manner. Hence, all checks 708, 708', 714, 714' can be imprinted by the one print head 902 of the printing unit 900, regardless of their orientation. Therefore, a printing unit 900 having a simple and cost-efficient structure may be employed. Further, with the above-describe method, it is not necessary to provide a separate turning unit for turning over the checks 708, 714, but turning over is effected by means of elements anyway required for transport.

A first reflection sensor 904 is provided upstream of the printing unit 900, and a second reflection sensor 906 is provided downstream of the printing unit 900. The reflection sensors 904, 906 are arranged such that it is possible to determine by means thereof the reflectivity of the printing area prior to imprinting, on the one hand, and after imprinting with the cancellation print image, on the other hand. For this purpose, the reflection sensors 904, 906 each illuminate the printing area with light of a preset brightness and detect the light reflected from the printing area, in particular the brightness thereof.

Dependent on the signal from the first reflection sensor 904 and the second reflection sensor 906, the control unit 28 determines whether the printing area has been imprinted with the cancellation print image as desired or whether an error has occurred. For example, the print head's print ribbon used for imprinting the printing area might be broken and/or the ink used might be consumed. Since in this case the check 708, 708', 714, 714' would not be cancelled as desired, or possibly would even be multiply processed, it must be verified whether the cancellation print image was applied as desired.

The control unit 28 determines dependent on the signal of the first reflection sensor 904 in particular a first value of a measure of the strength of the reflectivity, and dependent on the signal of the second reflection sensor 906 a second value of said measure of the strength of the reflectivity. Subsequently, the control unit 28 determines a difference value by subtracting the first value from the second value, or the second value from the first value, and compares this difference value with a preset minimum difference value. If the result of the comparison is that the determined difference value exceeds the preset minimum difference value the cancellation print image was imprinted correctly. If, on the contrary, the determined difference value falls below the preset minimum difference value, the conclusion is made that the cancellation print image was not imprinted correctly. In this case, in particular an error message is output via the display unit 34 so that the operator of the device 10 is informed that the printing unit 900 must be checked.

The cancellation print image in particular comprises a cancellation information, information on the date of input of the check 708, 708', 714, 714', information on a transaction number, and/or information on the account to which the amount of the check 708, 708', 714, 714' was credited.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The invention claimed is:

1. A device for cancelling notes of value comprising:
   a transport unit for transporting the notes of value along a first transport path, a second transport path, and a third transport path;
   a printing unit having a print head for imprinting a preset printing area of a note of value located on a print side of the note of value with a cancellation print image;
   a sorting gate for diverting notes of value between the first transport path, the second transport path, and the third transport path;
   a control unit for controlling the sorting gate;
   a sensor unit for determination of the orientation of the notes of value; and
   an intermediate storage for intermediate storage of the notes of value;

wherein:
   the second transport path connects the sorting gate with the intermediate storage, and the third transport path connects the sorting gate with the printing unit;
   the control unit controls the sorting gate to initially direct all notes of value from the first transport path to the second transport path by way of the sorting gate, and ultimately to the intermediate storage unit from the second transport path;
   the control unit controls the sorting gate to direct the notes of value stored at the intermediate storage unit from the intermediate storage unit and either directly from the second transport path to the third transport path and further to the print unit, or by way of a detour from the second transport path to the first transport path and then to the third transport path so that a print side of each one of the notes of value faces the print head of the print unit; and
   the control unit controls the sorting gate dependent on the determined orientation of each note of value withdrawn from the intermediate storage to be cancelled such that the sorting gate directs the note of value to be cancelled either directly from the second transport path into the third transport path, or directs the note of value first from the second transport path into the first transport path, and then from the first transport path into the third transport path.

2. The device according to claim 1, wherein the control unit determines dependent on the determined orientation which side of the note of value would face the print head if the note of value were transported directly from the second transport path into the third transport path and further to the printing unit, and that the control unit controls the sorting gate such that the sorting gate directs the note of value directly from the second transport path into the third transport path if said determined side is the print side of the note of value, and that otherwise the control unit controls the sorting gate such that the sorting gate directs the note of value first from the second transport path into the first transport path and then from the first transport path into the third transport path.

3. The device according to claim 1, wherein the sensor unit is arranged in the first transport path.

4. The device according to claim 1, wherein the sensor unit is arranged in the second transport path.

5. The device according to claim 1, wherein the transport unit supplies a note of value to be intermediately stored to the sorting gate along the first transport path, and that the sorting gate directs the note of value from the first transport path into the second transport path.

6. The device according to claim 1, wherein the sorting gate in a first sorting gate position diverts a note of value between the first transport path and the second transport path, diverts it in a second sorting gate position between the second transport path and the third transport path, and diverts it in a third sorting gate position between the first transport path and the third transport path.

7. The device according to claim 1, wherein the sensor unit comprises at least one sensor for detecting print images consisting of magnetic ink and/or magnetic toner, in particular a magnetic ink character recognition sensor.

8. The device according to claim 7, wherein the sensor unit detects a side of a note of value on which a magnetic information is provided, and that the control unit determines which side of the note of value is the print side dependent on the side on which the magnetic information is provided.

9. The device according to claim 1, wherein by means of the printing unit only a single-sided print is imprintable on the note of value.

10. A device for canceling notes of value, the device comprising:
   a sorting gate at a junction of a first transport path, a second transport path, and a third transport path to direct the notes of value between the first, second, and third transport paths;
   a control unit configured to control the sorting gate;
   an intermediate storage unit configured to store the notes of value, the second transport path directs the notes of value to and from the intermediate storage unit;
   a printing unit along the third transport path including a print head configured to print a cancellation print image on a first side of each one of the notes of value, the first side is opposite to a second side;
   a sensor configured to identify whether each one of the notes of value are stored on the intermediate storage unit in a first orientation or a second orientation opposite to the first orientation;
   wherein:
      to direct the notes of value to the intermediate storage unit for storage thereon, the control unit positions the sorting gate to direct the notes of value from the first transport path directly to the second transport path;
      if the sensor unit determines that a first note of value is stored on the intermediate storage unit in the first orientation, the control unit positions the sorting gate to route the first note of value from the second transport path directly to the third transport path, and ultimately to the printing unit where the printing unit prints the cancellation print image on the first side of the first note of value; and
      if the sensor unit determines that a second note of value is stored on the intermediate storage unit in the second orientation, the control unit positions the sorting gate to route the second note of value from the second transport path indirectly to the third transport path by way of the first transport path to change the second note of value from the second orientation to the first orientation such that at the printing unit the cancellation print image is printed on the first side of the second note of value.

* * * * *